(12) United States Patent
Ryuen et al.

(10) Patent No.: US 7,165,574 B2
(45) Date of Patent: Jan. 23, 2007

(54) SOLENOID VALVE WITH CYLINDRICAL VALVE GUIDE FOR THE SPHERICAL VALVE ELEMENT AT THE PRESSURE INLET

(75) Inventors: Shigeto Ryuen, Miyagi (JP); Hiroyuki Chiba, Miyagi (JP); Masamichi Kagawa, Miyagi (JP); Akira Nagasaki, Miyagi (JP)

(73) Assignee: Keihin Corporation, Tokyo (JP)

( * ) Notice: Subject to any disclaimer, the term of this patent is extended or adjusted under 35 U.S.C. 154(b) by 221 days.

(21) Appl. No.: 10/927,504

(22) Filed: Aug. 27, 2004

(65) Prior Publication Data

US 2005/0067028 A1 Mar. 31, 2005

(30) Foreign Application Priority Data

Sep. 3, 2003 (JP) .............................. 2003-312015
Sep. 3, 2003 (JP) .............................. 2003-312016

(51) Int. Cl.
*F16K 31/06* (2006.01)

(52) U.S. Cl. ............................. 137/596.17; 251/129.14

(58) Field of Classification Search ........... 137/596.17, 137/596.1, 625.65, 539, 539.5; 251/129.14, 251/129.15; 335/281, 297
See application file for complete search history.

(56) References Cited

U.S. PATENT DOCUMENTS

| 4,365,648 | A | * | 12/1982 | Grothe | ...................... | 137/539 |
|---|---|---|---|---|---|---|
| 5,104,091 | A | * | 4/1992 | Rathay et al. | ......... | 251/129.14 |
| 5,649,687 | A | * | 7/1997 | Rosas et al. | ............ | 251/129.15 |
| 5,915,416 | A | * | 6/1999 | Okazaki et al. | ........ | 137/596.17 |
| 6,244,295 | B1 | * | 6/2001 | Bartussek et al. | ..... | 137/596.17 |
| 6,431,209 | B1 | * | 6/2001 | Weiler, Jr. | ............. | 137/596.17 |
| 6,598,852 | B1 | * | 7/2003 | Tomoda et al. | ........ | 251/129.19 |
| 6,719,006 | B1 | * | 4/2004 | Fleischer et al. | ...... | 137/596.17 |
| 6,866,063 | B1 | * | 3/2005 | Avila | ..................... | 137/596.17 |
| 2004/0173269 | A1 | * | 9/2004 | Fleischer et al. | ...... | 137/625.65 |

FOREIGN PATENT DOCUMENTS

| DE | WO 01/88650 | * 11/2001 |
|---|---|---|
| JP | 2002-310328 | 10/2002 |

* cited by examiner

*Primary Examiner*—Eric Keasel
*Assistant Examiner*—Craig Schneider
(74) *Attorney, Agent, or Firm*—Arent Fox PLLC

(57) ABSTRACT

A valve device including a valve chamber having an inlet port at one end and a valve seat at the other end; a valve housing containing the valve chamber; the valve chamber accommodating a spherical valve element which performs opening and closing operation to the valve seat, and a valve spring which urges the valve element in a closing direction; and a push rod which penetrates a center hole of the valve seat and pushes the valve element in an opening direction. A cylindrical valve guide member is fit into the valve chamber, the cylindrical valve guide member including a plurality of guide projections on an inner peripheral surface to guide opening and closing operation of the valve element. Grooves between the plurality of guide projections serve as passages providing communication between the inlet port and the valve seat.

14 Claims, 4 Drawing Sheets

SOLENOID VALVE WITH CYLINDRICAL VALVE GUIDE FOR THE SPHERICAL VALVE ELEMENT AT THE PRESSURE INLET

BACKGROUND OF THE INVENTION

1. Field of the Invention

The present invention relates to the improvement of a valve device comprising: a valve chamber having an inlet port at one end and a valve seat at the other end; a valve housing containing the valve chamber; the valve chamber accommodating a spherical valve element which performs opening and closing operation to the valve seat, and a valve spring which urges the valve element in a closing direction; and a push rod which penetrates a center hole of the valve seat and pushes the valve element in an opening direction.

2. Description of the Related Art

Such a valve device has been already known as disclosed in Japanese Patent Application Laid-Open No. 2002-310328.

In such a conventional valve device, a spherical valve element is loosely accommodated in a valve chamber so that a passage is secured between the valve element and an inner peripheral surface of the valve chamber to provide communication between an inlet port and a valve seat. Therefore, the valve element may laterally oscillate at the time of an opening and closing operation. Hence, this is a cause of accelerating the abrasion of not only the valve element and the valve seat, but also a push rod which makes the valve element open.

SUMMARY OF THE INVENTION

The present invention has been achieved in view of such situation, and has an object to provide a valve device which can stably perform opening and closing operation of a valve element without lateral oscillation while securing a passage between an inlet port and a valve seat.

In order to attain the object, according to a first feature of the present invention, there is provided a valve device comprising: a valve chamber having an inlet port at one end and a valve seat at the other end; a valve housing containing the valve chamber; the valve chamber accommodating a spherical valve element which performs opening and closing operation to the valve seat, and a valve spring which urges the valve element in a closing direction; and a push rod which penetrates a center hole of the valve seat and pushes the valve element in an opening direction, wherein a cylindrical valve guide member is fit into the valve chamber, the cylindrical valve guide member including a plurality of guide projections on an inner peripheral surface to guide opening and closing operation of the valve element, and wherein grooves between the plurality of guide projections serve as passages providing communication between the inlet port and the valve seat.

With the first feature, it is possible to prevent the lateral oscillation of the valve element by restricting the opening and closing operation of the valve element to the valve seat by means of the plurality of guide projections of the valve guide member. Therefore, it is possible not only to smoothly and reliably perform the seating of the valve element on the valve seat, but also to prevent the abrasion of the push rod constantly abutting the valve element, as well as the valve element and valve seat.

Further, since the grooves between the guide projections serves as passages between the inlet port and the valve seat, it is possible to secure smooth flow of a fluid which should be controlled at the time of opening the valve device.

Furthermore, since the valve guide member is a component separate from the valve housing, if there is a change of the specification of the valve element, it is possible to respond thereto by modification of the structure of only the valve guide member, thereby suppressing increase in the cost as much as possible.

According to a second feature of the present invention, in addition to the first feature, a common circular member which retains the valve guide member and the valve spring at the inlet port is crimped and fixed to the valve housing.

With the second feature, it is possible to retain the valve guide member and the valve spring in the valve chamber by the common circular member in a very simple structure.

According to a third feature of the present invention, in addition to the second feature, the circular member is constructed by a circular base of a filter disposed at the inlet port.

With the third feature, the filter which filters a fluid flowing into the valve chamber serves also as a member for retaining the valve guide member and the valve spring in the valve chamber, thus eliminating need of a special supporting member, contributing to simplification of structure, and as a result, to cost reduction.

According to a fourth feature of the present invention, in addition to any one of the first to third features, the valve guide member comprises a tapered face having a diameter increasing toward the inlet port, and a cylindrical retention face which leads to a larger diameter end of the tapered face, on an inner periphery between an end portion toward the inlet port and the guide projections, and the valve spring is constructed by a conical coil spring which is disposed along the tapered face while a larger diameter end portion is retained by the cylindrical retention face.

With the fourth feature, it is possible to provide the valve spring which is constructed by a conical coil spring, which is hard to be tilted, along the tapered face inside the valve guide member, while the larger diameter end portion of the valve spring is supported by the cylindrical retention face, thereby providing stabilization of opening and closing postures of the valve element.

According to a fifth feature of the present invention, in addition to any one of the first to third features, the valve guide member is made of a synthetic resin.

With the fifth feature, even if the shape of the valve guide member is comparatively complicated, it is possible to easily form the valve guide member regardless of the valve housing. Also, it is possible not only to further easily respond to the change of the specifications of the valve element, but also to provide the valve guide member in a low cost.

According to a sixth feature of the present invention, in addition to the first feature, the valve device further comprising an electromagnetic actuator which operates the push rod, the electromagnetic actuator including a coil housing which is made of a magnetic material and is coupled with the valve housing, a coil assembly which has a bobbin and a coil wound around the bobbin and is fit into the coil housing, a fixed core which is coupled with one end of the coil housing and is located in the bobbin, a movable core which is located movably in an axial direction in the bobbin while facing the fixed core, and is connected with the push rod; the movable core is constructed into a bottomed cylindrical shape; the movable core is slidably fit to an outer peripheral surface of a guide core which is fixed to the other end of the coil housing and located in the bobbin; and an axial attraction generated between the movable core and the guide core at the time of energizing the coil is smaller than an attraction generated between the movable core and the fixed core.

With the sixth feature, in the actuator which operates the push rod, since the movable core constructed into a bottomed cylindrical shape is slidably supported by the outer peripheral surface of the guide core fixed to the coil housing, it is possible to secure a sufficiently long support span of the movable core by the guide core. Therefore, it is possible to reliably prevent the inclination and tilt of the movable core, thereby lightly operating the movable core to improve its response. In addition, the guide core is located in the bobbin as in the case of the movable core, never leading to increase in the overall length of the electromagnetic actuator. Furthermore, since the movable core has a cylindrical bottomed shape containing a hollow portion, the movable core is lightweight, thereby also improving the response of the movable core.

Moreover, since the axial attraction generated between the movable core and the guide core is smaller than the attraction generated between the movable core and the fixed core at the time of energizing the coil, it is possible to reliably operate the movable core toward the fixed core.

According to a seventh feature of the present invention, in addition to the sixth feature, axially opposite gaps between the movable core and the guide core are set to be larger than an axially opposite gap between the movable core and the fixed core.

With the seventh feature, since the axial attraction generated between the movable core and the guide core can be easily made smaller than the axial attraction generated between the movable core and the fixed core at the time of energizing the coil, it is possible to reliably operate the movable core toward the fixed core.

According to an eighth feature of the present invention, in addition to the sixth or seventh feature, the guide core is fixed to an end wall by projectingly providing a small fixation axis on an end face of the guide core, and fitting the small fixation axis into a fixation hole provided in an end wall of the coil housing and crimping it.

With the eighth feature, since the guide core is a component separate from the coil housing, processing such as polishing for securing slidability can be made to the guide core without being interfered by the coil housing. Also, after the processing, the guide core can be easily crimped and fixed to the coil housing.

According to a ninth feature of the present invention, in addition to the sixth or seventh feature, the guide core is constructed by a fixed portion which is fixed to an end wall of the coil housing and fit to an inner peripheral surface of the bobbin, and a guide portion which projects from a tip end of the fixed portion, is slidably fit to the movable core, and has a diameter smaller than that of the fixed portion.

With the ninth feature, by the larger diameter fixed-portion of the guide core fitting to the inner peripheral surface of the bobbin and the smaller diameter guide portion supporting the movable core, it is possible to secure the concentricity of three components, that is, the guide core, movable core, and bobbin in high accuracy. Therefore, even if the gap between the movable core and bobbin is minimized within a range allowed for accuracy, it is possible to prevent their mutual interventions, and hence it is possible to contribute to the reduction in diameter of the electromagnetic actuator.

According to a tenth feature of the present invention, in addition to the sixth or seventh feature, the movable core has a breather hole which communicates its interior space with a gap between the movable core and the bobbin.

With the tenth feature, since the reciprocation of the movable core moves a fluid back and forth between its interior space and the gap between the movable core and the bobbin, it is possible to eliminate the resistance of the fluid to the movable core.

According to an eleventh feature of the present invention, in addition to the sixth or seventh feature, a nonmagnetic coating film is formed on at least one sliding surface of the movable core and the guide core.

With the eleventh feature, since the nonmagnetic coating film intervenes between the guide core and the movable core, it is possible to prevent the cores from attracting each other if there is a magnetic flux flowing between the guide core and the movable core at the time of energizing the coil. Therefore, it is possible to obtain a good operational characteristic of the movable core. Moreover, by cutting off residual magnetism between the movable core and the sliding surface of the guide core by means of the nonmagnetic coating film at the time of demagnetizing the coil, it is possible to enhance the return response of the movable core.

The above-mentioned object, other objects, features, and advantages of the present invention will become clear from the detailed description of a preferred embodiment with reference to the accompanying drawings.

DESCRIPTION OF THE PREFERRED EMBODIMENT

Figure 1:
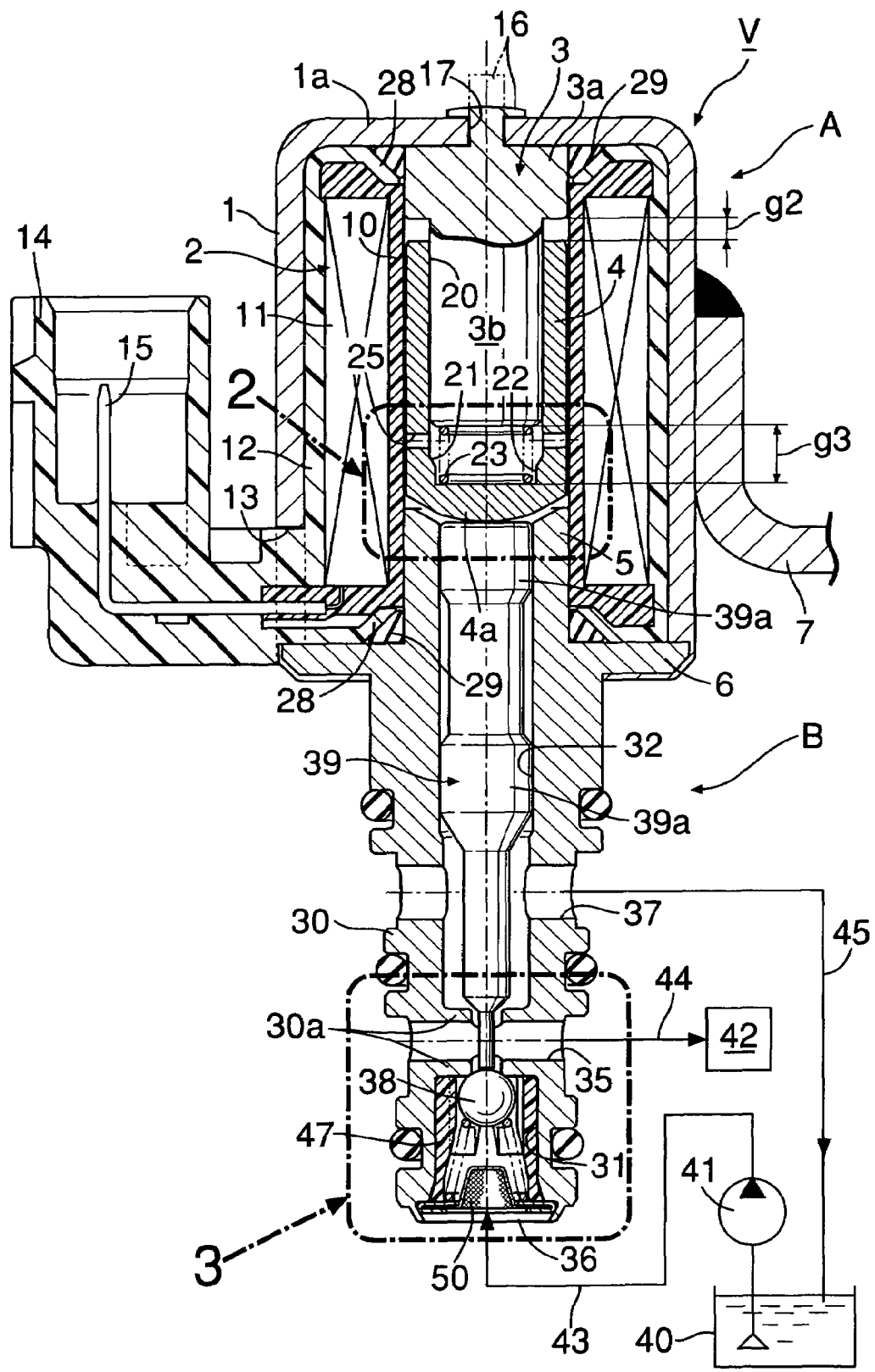
FIG. 1 is a vertical sectional view of a solenoid valve according to an embodiment of the present invention.

Referring first to FIG. 1, a solenoid valve V comprises an electromagnetic actuator A, and a three-way valve B which is operated by the electromagnetic actuator A to switch a direction of flow of operating oil.

The electromagnetic actuator A comprises a cylindrical bottomed coil housing 1 which opens at one end surface, a coil assembly 2 fit in the coil housing 1, a guide core 3 which is fixed to an end wall 1a of the coil housing 1 and is located in a hollow portion of the coil assembly 2, a movable core 4 slidably fit to an outer periphery of the guide core 3 in the hollow portion of the coil assembly 2, a fixed core 5 which is located at the hollow portion of the coil assembly 2 so as to face the movable core 4 on the side opposite to the guide core 3, and a yoke 6 which integrally projects out of an outer periphery of this fixed core 5 into a flange-like shape to be connected to an open end of the coil housing 1. These components will be sequentially described.

The cylindrical coil housing 1 with a bottom is constructed with a magnetic material, and in its outer side face, a mounting bracket 7 is fixed by welding or the like.

The coil assembly 2 is constructed by a bobbin 10 which is made of a synthetic resin and has a pair of flanges at opposite ends, a coil 11 wound around this bobbin 10, and a sealed body 12 which is made of a synthetic resin and covers them from an entire outer peripheral surface of the coil 11 to opposite end faces of the bobbin 10. At an end of the sealed body 12, a coupler 14 which projects outside from a notch 13 provided in an open end of the coil housing 1 is integrally formed, and a base of a connecting terminal 15 which leads to the coil 11 is buried in the coupler 14.

After being fit from the open-end side into the coil housing 1, the coil assembly 2 is retained in the coil housing 1 by the yoke 6 being crimped and fixed to the open end of the coil housing 1.

The guide core 3 comprises a fixed portion 3a which is fixed to the end wall 1a of the coil housing 1, and is fit to an inner peripheral surface of an end portion of the bobbin 10, and a guide portion 3b which is integrally provided in a projecting manner in an inner end of the fixed portion 3a, and has a diameter smaller than the fixed portion 3a and an axial length longer than the fixed portion 3a. The guide core 3 forms a stepped cylinder as a whole. The fixed portion 3a is fixed to the end wall 1a of the coil housing 1 as follows: a small fixation axis 16 which is projectingly provided at a central portion of the outer end face of the fixed portion 3a is fit into a fixation hole 17 of the central portion of the end wall 1a; and an outer end portion of the small fixation axis 16 is crimped to the end wall 1a.

In this manner, the fixed portion 3a fixed to the coil housing 1 fits to the inner peripheral surface of the bobbin 10, thereby securing concentricity of the guide core 3 and bobbin 10.

The guide core 3 is ground particularly on an outer peripheral surface of the guide portion 3b before being fixed to the coil housing 1. Therefore, the polishing of the guide portion 3b can be performed easily without being interfered by the coil housing 1. The polishing of the outer peripheral surface of the guide portion 3b contributes to improvement of slidability of the guide portion 3b to the movable core 4.

The movable core 4 has a cylindrical bottomed shape with an end wall 4a directed toward the fixed core 5. A hollow portion of the movable core 4 is constructed by a guide hole 20 slidably fit to the outer periphery of the guide portion 3b, and a spring retention hole 22 which leads through a tapered face 21 to an inner end of this guide hole 20 and runs to a dead end of the end wall 4a. A coiled contact spring 23 urging the movable core 4 toward the fixed core 5 is provided under compression between the movable core 4 and the fixed core 5. At that time, an end portion of the contact spring 23 is inserted and retained in the spring retention hole 22 while being guided by the tapered face 21.

Provided between the movable core 4 and bobbin 10 are a gap 24 so as not to inhibit the sliding of the movable core 4 with respect to the guide core 3, and a breather hole 25 which communicates a space portion between the end wall 4a of the movable core 4 and an end face of the guide portion 3b with the gap 24.

A nonmagnetic coating film is formed all over the inner and outer surfaces of the movable core 4. For example, Kanigen plating (Ni-P plating) is performed for forming this nonmagnetic coating film.

The fixed core 5 integral with the yoke 6 forms a hollow cylindrical shape. This fixed core 5 is fit to an inner peripheral surface of an end portion of the bobbin 10 opposite to the guide core 3, thereby securing the concentricity of the fixed core 5 and coil assembly 2. The outer diameter of the movable core 4 is set at substantially the same diameter as that of the fixed core 5, more accurately, at a slightly smaller diameter than that of the fixed core 5. In addition, the outer diameter of the fixed core 5 is set at the same diameter as that of the fixed portion 3a of the guide core 3.

Figure 2:
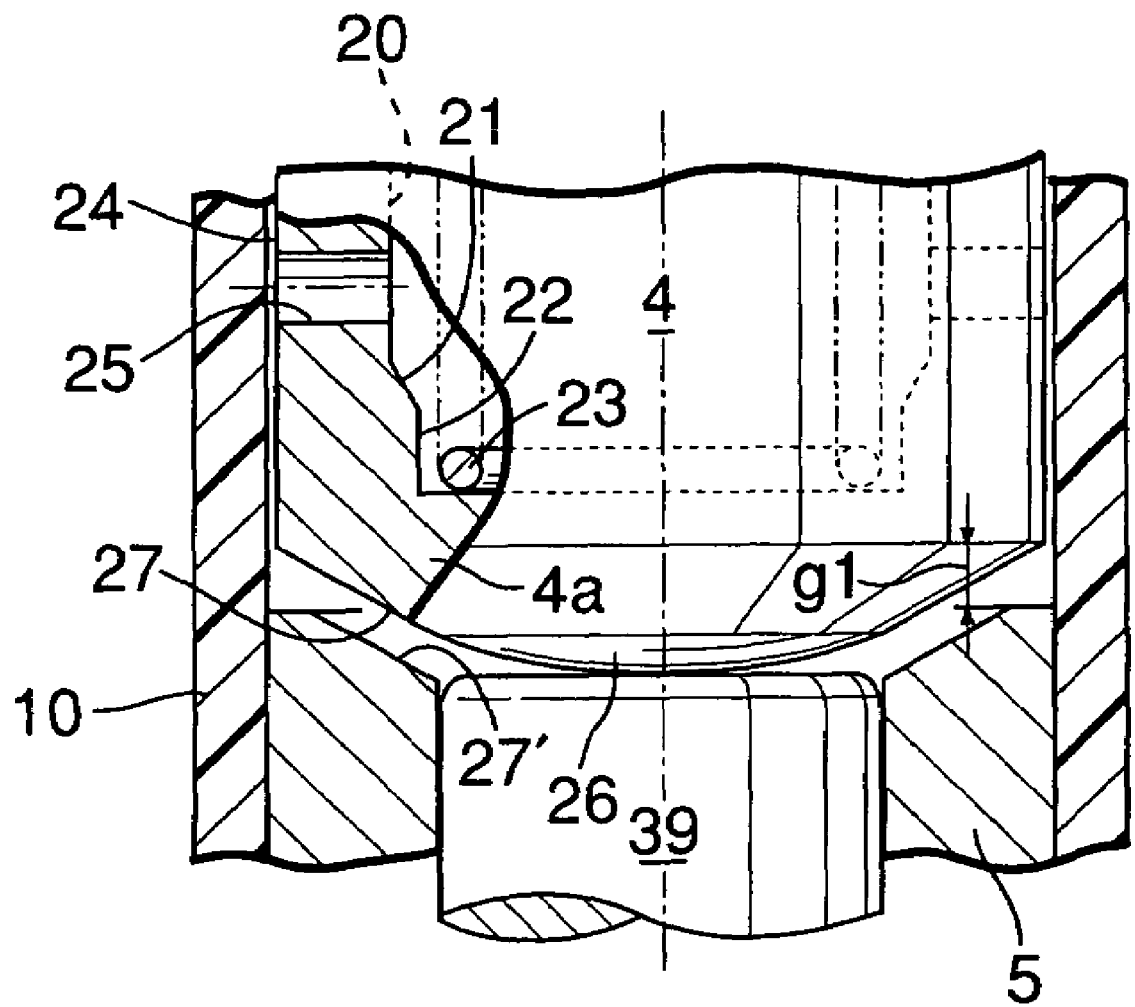
FIG. 2 is a partially enlarged view of a portion 2 of FIG. 1.

As clearly shown in FIG. 2, the movable core 4 has an outer end face of the end wall 4a which includes a convex spherical surface 26 at a central portion and a truncated conical surface 27 at an outer peripheral portion; and the fixed core 5 has an inner end face which includes a concave truncated conical surface 27' whose center angle is equal to that of the truncated conical surface 27.

A retreat position of the movable core 4 is restricted by the spherical surface 26 abutting to a flat end face of a second valve element 39 of the three-way valve B which will be described later, and at that time, a fixed gap g1 is generated between both the truncated conical surfaces 27 and 27' of the fixed core 5 and the movable core 4.

Again in FIG. 1, in the inside and outside of the movable core 4, gaps g2 and g3 sufficiently larger than the gap g1 are provided between end faces of this movable core 4 and the guide core 3 facing each other in an axial direction so that an axial attraction generated by the excitation of the coil 11 can be minimized.

Formed in the radial inner peripheral portion of both end walls of the sealed body 12 in the coil assembly 2 are pair of funnel portions 28 and 28 which have the same diameter decreasing in an axially inward direction. An O-ring 29 is filled in a circular space surrounded by three components of one funnel portion 28, the fixed portion 3a of the guide core 3, and the end wall 1a of the coil housing 1. In addition, a circular space surrounded by three components of the other funnel portion 28, the fixed core 5, and yoke 6 is filled by another O-ring 29. That is, both end portions of the hollow portion of the coil assembly 2 are sealed by both the O-rings 29. In this case, since diameters of both the funnel portions 28 and 28 are the same and diameters of the fixed core 5 and fixed portion 3a of the guide core 3 are the same, it is possible to use the pair of O-rings 29 and 29 having the same diameter, and hence there is no fear of erroneous attachment of the O-rings 29 and 29.

Next, with reference to FIGS. 1, 3, and 4, the three-way valve B will be explained.

Figure 3:
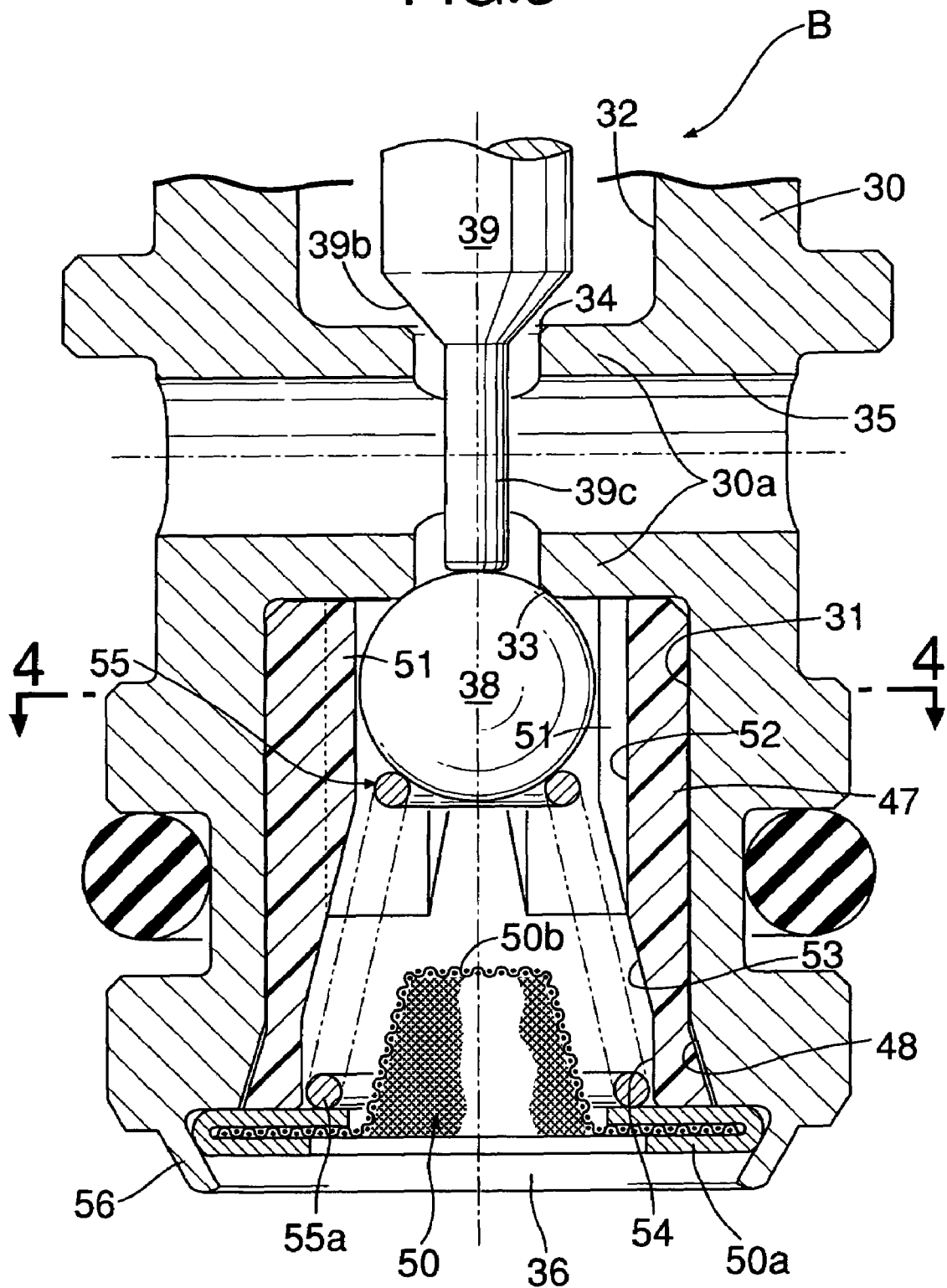
FIG. 3 is a partially enlarged view of a portion 3 of FIG. 1.
Figure 4:
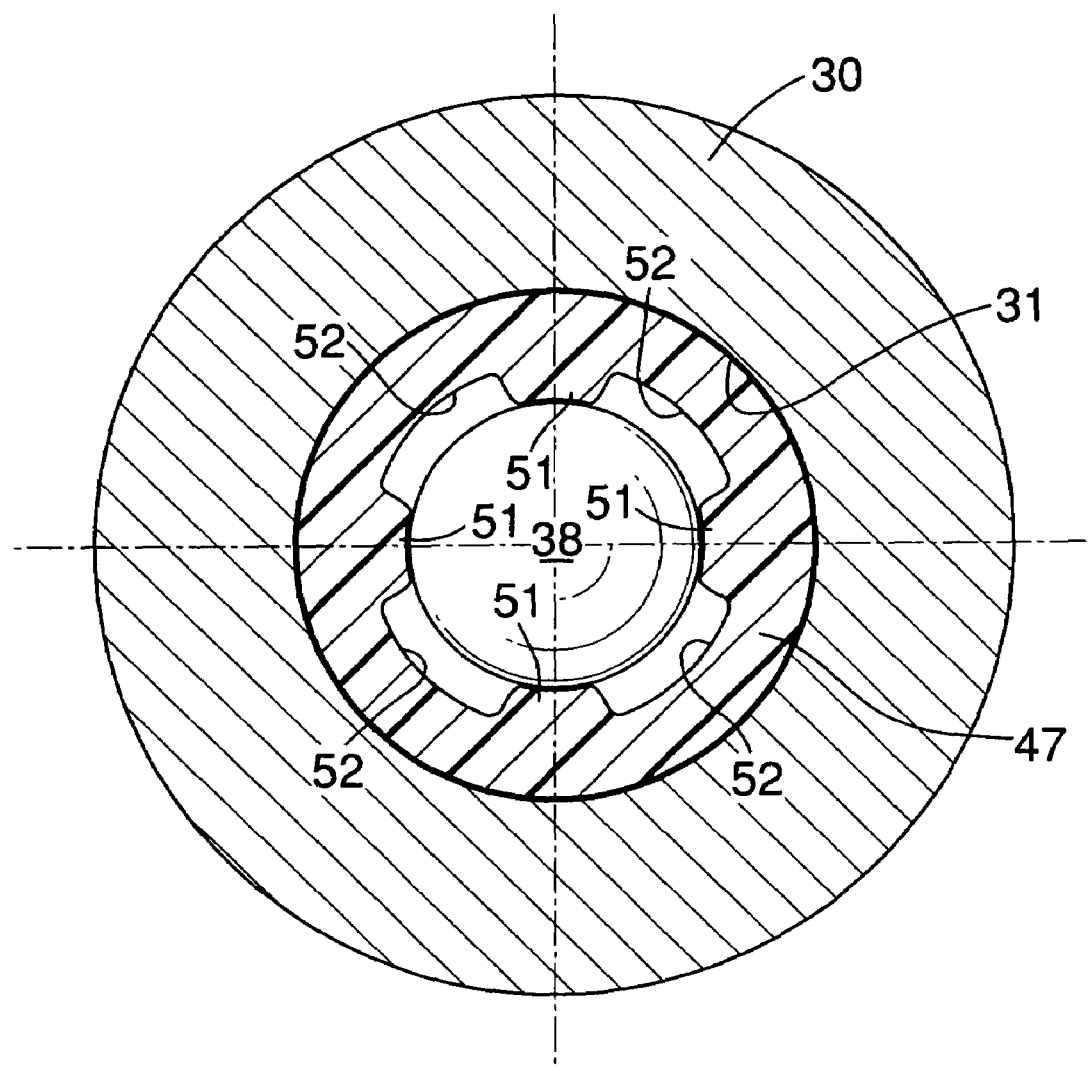
FIG. 4 is a sectional view taken on line 4—4 in FIG. 3.

In FIGS. 1 and 3, the three-way valve B comprises a cylindrical valve housing 30 formed integrally with an outer end face of the yoke 6 and coaxially with the fixed core 5. Provided inside the valve housing 30 are a first valve chamber 31 located at a tip end side, and a second valve chamber 32 coaxially lined with the first valve chamber 31 with a bulkhead 30a integral with the valve housing 30 between the first and second valve chamber 31 and 32. The second valve chamber 32 leads to a hollow portion of the fixed core 5, and its axial length is longer than that of the first valve chamber 31. Formed at opposite end faces of the bulkhead 30a are a first conical valve seat 33 which faces the first valve chamber 31, and a conical second valve seat 34 which faces the second valve chamber 32. An output port 35 which leads to center holes of both the valve seats 33 and 34 is provided so as to penetrate the bulkhead 30a in a diametral direction.

An end of the first valve chamber 31 on the side opposite to the bulkhead 30a is opened as an inlet port 36 of the valve chamber 31. In addition, a return port 37 leading to the second valve chamber 32 at a location comparatively near the second valve seat 34 is provided in the valve housing 30.

An input oil passage 43 leading to a hydraulic pressure source 41 forcibly feeding operating-oil pumped up from an oil reservoir 40, an output oil passage 44 leading to hydraulic pressure operating equipment 42, and a return oil passage 45 opened to the oil reservoir 40 are connected to the inlet port 36, output port 35, and return port 37, respectively.

A first valve element 38 and a second valve element 39 are disposed in the first valve chamber 31 and the second valve chamber 32, respectively. In cooperation between the first and second valve elements 38 and 39, and first and second valve seats 33 and 34, communication and blocking between the inlet port 36 and the output port 35, and communication and blocking between the output port 35 and the return port 37 are controlled.

More detailed description is as follows. A valve guide member 47 made of a synthetic resin is fit on the inner peripheral surface of the first valve chamber 31. The inlet port 36 side end portion of an inner peripheral surface of the first valve chamber 31 is formed to be a tapered guide face 48 whose diameter is increasing toward the inlet port 36, and is designed to guide the fitting of the first valve chamber 31 with the valve guide member 47. In addition, an outer peripheral surface of an end portion of the valve guide member 47 is also formed to be a tapered face corresponding to the guide face 48. The outer end face of the guide member 47 and the outer end face of the valve housing 30 are disposed to be flush with each other, and a circular base 50a of an oil filter 50 is stacked on these outer end faces. Then, a cylindrical crimping protrusion 56 projectingly provided on the outer end face of the valve housing 30 is crimped in a radially inward direction so as to surround the circular base 50a, so that the oil filter 50 is fixed to a peripheral portion of the inlet port 36 of the first valve chamber 31. The oil filter 50 has a cup-shaped filtering-net 50b which plunges into the valve guide member 47 from the inner peripheral end of the circular base 50a, thereby filtering the operating oil which flows into the first valve chamber 31 from the input oil passage 43.

Integrally formed on an inner peripheral surface of the valve guide member 47 are a plurality of guide projections 51 and 51 . . . (see FIG. 4: four in this illustration) which are adjacent to the first valve seat 33 and are extended in an axial direction. A spherical first valve element 38 which contacts to and separates from the first valve seat 33 while being guided by the guide projections 51, 51 . . . is accommodated in the valve guide member 47. The first valve element 38 is constructed by a steel ball. In the inner peripheral surface of the valve guide member 47, a plurality of grooves 52, 52 . . . formed between the plurality of guide projections 51, 51 . . . serve as passages which provide communication between the inlet port 36 and first valve seat 33.

In addition, an intermediate portion of the inner peripheral surface of the valve guide member 47 is formed to be a tapered face 53 whose diameter is increasing toward the oil filter 50, and the guide projections 51, 51 . . . are terminated by a smaller diameter end portion of the tapered face 53. Furthermore, an inlet port 36 side end portion of the inner peripheral surface of the valve guide member 47 is formed to be a cylindrical retention face 54 leading to a larger diameter end portion of the tapered face 53. An inner peripheral end of the circular base 50a of the oil filter 50 overhangs in a radially inward direction from the cylindrical retention face 54. A valve spring 55 is provided under compression between such an overhanging portion and the first valve element 38, to urge the first valve element 38 in the direction to seat on the first valve seat 33. The valve spring 55 comprises a conical coil spring extending along the tapered face 53, and its larger diameter end portion 55a is fit to and positioned by the cylindrical retention face 54.

On the other hand, the second valve element 39 is a rod made of a nonmagnetic material, and is accommodated in the second valve chamber 32 slidably in an axial direction. In order to stabilize the sliding posture of the second valve element 39, a pair of circular journals 39a and 39a, which slidably fit on an inner peripheral surface of the second valve chamber 32 in the movable core 4 side than the return port 37, are integrally formed in a movable core 4 side end portion and an intermediate portion of the second valve element 39.

In addition, the second valve element 39 has a conical valve portion 39b which contacts to and separate from the second valve seat 34, and a small-diametered push rod 39c which projects from an end of the valve portion 39b. The push rod 39c is disposed so as to sequentially penetrate center holes of the second valve seat 34 and first valve seat 33 from the second valve chamber 32, and contact its end to the first valve element 38. The push rod 39c has a length such that the valve portion 39b of the second valve element 39 separate from the second valve seat 34 by being pushed by the first valve element 38 when the first valve element 38 seats on the first valve seat 33, and that the first valve element 38 separate from the second valve seat 34 by pushing the first valve element 38 when the valve portion 39b seats on the second valve seat 34.

In the embodiment, the set load of the valve spring 55 which urges the first valve element 38 toward the first valve seat 33 is set to be larger than the set load of the contact spring 23 which makes the fixed core 5 abut the movable core 4.

Next, the operation of this embodiment will be described.

In a state in which the coil 11 of the electromagnetic actuator A is demagnetized, the first valve element 38 is seated on the first valve seat 33 by the urging force of the valve spring 55, and thus the first valve element 38 pushes the push rod 39c of the second valve element 39, so that the valve portion 39b of the second valve element 39 separates from the second valve seat 34. Therefore, the input oil passage 43 is shut down, the output oil passage 44 and return oil passage 45 are connected to each other, and hence the hydraulic pressure operating equipment 42 releases the operating hydraulic pressure to the return oil passage 45 and enters a non-operative state.

On the other hand, in the electromagnetic actuator A, the second valve element 39 presses the movable core 4 with the urging force of the valve spring 55 against the set load of the contact spring 23, to thereby keep a retreat position. As a result, a fixed gap g1 is generated between the movable core 4 and opposite end faces of the fixed core 5.

When the coil 11 is excited by sending an electrical current, a magnetic flux generated by it sequentially runs through the coil housing 1, yoke 6, fixed core 5, movable core 4, guide core 3, and coil housing 1. With this operation, the movable core 4 presses the second valve element 39 owing to an axial attraction by the magnetism generated between the fixed core 5 and movable core 4 against the set load of the valve spring 55 while being drawn in by the fixed core 5, causes the valve portion 39b to seat on the second valve seat 34, and pushes the first valve element 38 with the push rod 39c concurrently to separate the first valve element 38 from the first valve seat 33. Therefore, the output oil passage 44 is connected with the input oil passage 43, while being shut down from the return oil passage 45. As a result, hydraulic pressure is supplied from the hydraulic pressure source 41 through the input oil passage 43 and output oil passage 44 to the hydraulic pressure operating equipment 42, thereby bringing the hydraulic pressure operating equipment 42 into an operative condition.

In this process, an axial attraction generated between the movable core 4 and guide core 3 is small enough to be ignored because these opposed gaps g2 and g3 are set to be sufficiently large as described above. Therefore, a thrust of the movable core 4 pressing the second valve element 39 is governed by an attraction generated between the fixed core 5 and movable core 4.

The opposed gap g1 between the movable core 4 and fixed core 5 in the demagnetized state of the coil 11 is set to be minimum which do not make the fixed core 5 abut the movable core 4, in order to secure a steady state of the valve portion 39b seating on the second valve seat 34 even in the magnetized state of the coil 11. Moreover, since the opposite end faces of the movable core 4 and fixed core 5 are in the truncated conical surfaces 27 and 27', it is possible to give linearity to a motion of the movable core 4, thereby transferring a comparatively large opening and closing stroke from the movable core 4 to the second valve element 39 and first valve element 38. In addition, not only it is possible to improve response by increasing the thrust of the movable core 4 at an initial stage of the operation, but also it is possible to decrease the valve-closing impact of the second valve element 39 by suppressing a rapid increase of the thrust at a final stage of the operation of the movable core 4.

Since the contact surface of the movable core 4 against the flat end face of the second valve element 39 is the spherical surface 26, the movable core 4 can always apply the thrust on a central portion of the second valve element 39, and hence, by virtue of the pair of journal portions 39a and 39a of the second valve element 39 being slidably supported on the inner peripheral surface of the second valve chamber 32, it is possible to always stabilize the opening and closing postures of the second valve element 39.

In addition, since the movable core 4 has a cylindrical bottomed shape and is slidably supported by the outer peripheral surface of the guide portion 3b of the guide core 3 fixed to the coil housing 1, a support span of the movable core 4 by the guide core 3 is enough if it is a length near the overall length of the inner peripheral surface of the movable core 4. Therefore, the inclination and tilt of the movable core 4 can be reliably prevented, and the light slide of the movable core 4 can be secured, thereby improving its response. In addition, the guide core 3 is located in the bobbin 10 as in the case of the movable core 4, providing no increase in the overall length of the electromagnetic actuator A.

Furthermore, the nonmagnetic coating film is formed on the entirety of the inner and outer surfaces of the movable core 4 which is slidably fit on the outer peripheral surface of the guide core 3, that is, the nonmagnetic coating film intervenes between the guide core 3 and movable core 4. Therefore, the nonmagnetic coating film prevents the cores 3 and 4 from attracting each other even if there is a magnetic flux flowing between the guide core 3 and movable core 4 at the time of energizing the coil 11, thereby obtaining a good operational characteristic of the movable core 4. Moreover, by cutting off residual magnetism between the movable core and sliding surface of the guide core by the nonmagnetic coating film at the time of demagnetizing the coil, it is possible to enhance the return response of the movable core. In addition, since the existence of the nonmagnetic coating film hardly affects the thickness of the movable core 4, it is effective in decreasing the size of the electromagnetic actuator A, especially in the radial direction.

Moreover, since the movable core 4 has the cylindrical bottomed shape containing a hollow portion, the movable core 4 is lightweight, also contributing to the improvement of response.

The lubrication of the sliding surfaces of the journals 39a and 39a of the second valve element 39, the movable core 4 and guide core 3 is performed by the oil which flows into the second valve chamber 32. Therefore, the oil infiltrates also into the gap 24 between the bobbin 10 and movable core 4 and the inside of the movable core 4. Since the movable core 4 has a breather hole 25, which communicates its interior space with the gap 24 between the movable core 4 and bobbin 10, the oil goes back and forth between the interior space and the gap 24 accompanying the reciprocation of the movable core 4, thereby eliminating the operating resistance of the movable core 4 due to the oil.

Since the larger diameter fixed-portion 3a of the guide core 3 is fit on the inner peripheral surface of the bobbin 10, and the movable core 4 is supported by the smaller diameter guide portion 3b, it is possible to enhance the concentricity accuracy of three components, that is, the guide core 3, movable core 4, and bobbin 10. Therefore, even if the gap between the movable core 4 and bobbin 10 is decreased to the minimum within the range allowed for accuracy, it is possible to prevent their mutual interventions, thereby contributing to the reduction of diameter of the electromagnetic actuator A.

On the other hand, since the opening and closing operation of the first valve element 38 to the first valve seat 33 is restricted by the plurality of guide projections 51, 51 . . . of the valve guide member 47, unnecessary lateral oscillation is not given to the first valve element 38. Therefore, not only it is possible to provide a smooth and reliable seating on the first valve seat 33, but also it is possible to contribute to the prevention of abrasion of the push rod 39c of the second valve element 39 constantly abutting to the first valve element 38, as well as the first valve element 38 and the first valve seat 33.

In addition, since the grooves 52, 52 . . . between the guide projections 51, 51 . . . serve as passages between the inlet port 36 and first valve seat 33 at the time of opening the first valve element 38, it is possible to secure the smooth flow of the operating oil in the first valve chamber 31.

Since the valve guide member 47 is a synthetic resin component separate from the valve housing 30, it is possible to simply form the valve guide member 47 regardless of the valve housing 30, even if its shape is comparatively complicated. In addition, it is possible to respond to the change in the specification of the first valve element 38 by modification of the structure of only the valve guide member 47 and in low cost.

Furthermore, since the valve spring 55 is retained by the circular base 50a of the oil filter 50 which is crimped and fixed to the end portion of the valve housing 30, the circular base 50a serve also as a retainer member of the valve spring 55. Therefore, need for of the special retainer member is eliminated, thereby simplifying the structure to contribute to the cost reduction.

Moreover, since the guide projections 51, 51 . . . and cylindrical retention face 54 of the inner peripheral face of the valve guide member 47 constitute the taper surface 53, the valve spring 55, which is constructed by a conical coil spring which is hard to be tilted, can be provided along the tapered face 53, while the larger diameter end portion 55a of the valve spring 55 is supported by the cylindrical retention face 54, it is possible to provide stabilization of opening and closing postures of the first valve element 38.

The present invention is not limited to the embodiments mentioned above, and various engineering changes are possible within the scope of its gist. For example, nonmagnetic coating may be formed on the guide core 3 instead of forming it on the movable core 4.

What is claimed is:

1. A valve device comprising: a valve chamber having an inlet port at one end and a valve seat at the other end; a valve housing containing the valve chamber; the valve chamber accommodating a spherical valve element which performs opening and closing operation to the valve seat, and a valve spring which urges the valve element in a closing direction; a push rod which penetrates a center hole of the valve seat and pushes the valve element in an opening direction; and an electromagnetic actuator which operates the push rod, the electromagnetic actuator including a coil housing which is made of a magnetic material and is coupled with the valve housing, a coil assembly which has a bobbin and a coil wound around the bobbin and is fit into the coil housing, a fixed core which is coupled with one end of the coil housing and is located in the bobbin, a movable core which is located movably in an axial direction in the bobbin while facing the fixed core, and is connected with the push rod, wherein a cylindrical valve guide member is fit into the valve chamber, the cylindrical valve guide member including a plurality of guide projections on an inner peripheral surface to guide opening and closing operation of the valve element, and wherein grooves between the plurality of guide projections serve as passages providing communication between the inlet port and the valve seat, wherein the movable core is constructed into a bottomed cylindrical shape, wherein the movable core is slidably fit to an outer peripheral surface of a guide core which is fixed to the other end of the coil housing and located in the bobbin, and wherein an axial attraction generated between the movable core and the guide core at the time of energizing the coil is smaller than an attraction generated between the movable core and the fixed core.

2. The valve device according to claim 1, wherein axially opposite gaps between the movable core and the guide core are set to be larger than an axially opposite gap between the movable core and the fixed core.

3. The valve device according to claim 2, wherein the guide core is fixed to an end wall by projectingly providing a small fixation axis on an end face of the guide core, and fitting the small fixation axis into a fixation hole provided in an end wall of the coil housing and crimping it.

4. The valve device according to claim 2, wherein the guide core is constructed by a fixed portion which is fixed to an end wall of the coil housing and fit to an inner peripheral surface of the bobbin, and a guide portion which projects from a tip end of the fixed portion, is slidably fit to the movable core, and has a diameter smaller than that of the fixed portion.

5. The valve device according to claim 2, wherein the movable core has a breather hole which communicates its interior space with a gap between the movable core and the bobbin.

6. The valve device according to claim 2, wherein a nonmagnetic coating film is formed on at least one sliding surface of the movable core and the guide core.

7. The valve device according to claim 1, wherein the guide core is fixed to an end wall by projectingly providing a small fixation axis on an end face of the guide core, and fitting the small fixation axis into a fixation hole provided in an end wall of the coil housing and crimping it.

8. The valve device according to claim 1, wherein the guide core is constructed by a fixed portion which is fixed to an end wall of the coil housing and fit to an inner peripheral surface of the bobbin, and a guide portion which projects from a tip end of the fixed portion, is slidably fit to the movable core, and has a diameter smaller than that of the fixed portion.

9. The valve device according to claim 1, wherein the movable core has a breather hole which communicates its interior space with a gap between the movable core and the bobbin.

10. The valve device according to claim 1, wherein a nonmagnetic coating film is formed on at least one sliding surface of the movable core and the guide core.

11. The valve device according to claim 1, wherein a common circular member which retains the valve guide member and the valve spring at the inlet port is crimped and fixed to the valve housing.

12. The valve device according to claim 11, wherein the circular member is constructed by a circular base of a filter disposed at the inlet port.

13. The valve device according to claim 1, wherein the valve guide member comprises a tapered face having a diameter increasing toward the inlet port, and a cylindrical retention face which leads to a larger diameter end of the tapered face, on an inner periphery between an end portion toward the inlet port and the guide projections; and wherein the valve spring is constructed by a conical coil spring which is disposed along the tapered face while a larger diameter end portion is retained by the cylindrical retention face.

14. The valve device according to claim 1, wherein the valve guide member is made of a synthetic resin.

* * * * *